United States Patent

[11] 3,581,275

| | | |
|---|---|---|
| [72] | Inventor | Paul S. Petersen<br>Minnetonka, Minn. |
| [21] | Appl. No. | 503,652 |
| [22] | Filed | Oct. 23, 1965 |
| [45] | Patented | May 25, 1971 |
| [73] | Assignee | Rosemount Engineering Company<br>Minneapolis, Minn. |

[54] MOIRE FRINGE PRODUCING DEVICE USED FOR INTERCEPTION COURSE INDICATION
6 Claims, 8 Drawing Figs.

[52] U.S. Cl. ............................................. 340/25, 240/46.07
[51] Int. Cl. ............................................. G08g 5/00, G64f 1/20
[50] Field of Search ............................. 340/25, 26, 29; 240/1.2, 46.01, 46.07, 46.39, 46.45, 46.51; 350/162, 167, 169, 211, 263, 266, 271, 272; 116/18—20; 40/106.52, 106.3, 125, 135; 33/46, 46.5

[56] References Cited
UNITED STATES PATENTS

| | | | |
|---|---|---|---|
| 2,257,420 | 9/1941 | Lau | 33/46X |
| 2,378,823 | 6/1945 | Bartow | 240/1.2 |
| 2,572,451 | 10/1951 | Custer | 340/26 |
| 3,054,086 | 9/1962 | Holm | 340/25 |
| 3,152,316 | 10/1964 | Baxter et al. | 340/26 |
| 3,191,146 | 6/1965 | Mitchell | 340/26 |
| 3,259,985 | 7/1966 | Neal | 340/26X |

*Primary Examiner*—Alvin H. Waring
*Attorney*—Dugger, Johnson & Westman

ABSTRACT: A landing aid utilizing the principle of Moire fringe patterns so that a plurality of wide light and dark bands are observed by a person using the landing aid, and when on proper course, the bands do not move, but when on other than an interception course, the bands appear to move, and such movement will be in relationship to the amount of error in the interception course.

PATENTED MAY 25 1971
3,581,275
SHEET 1 OF 3
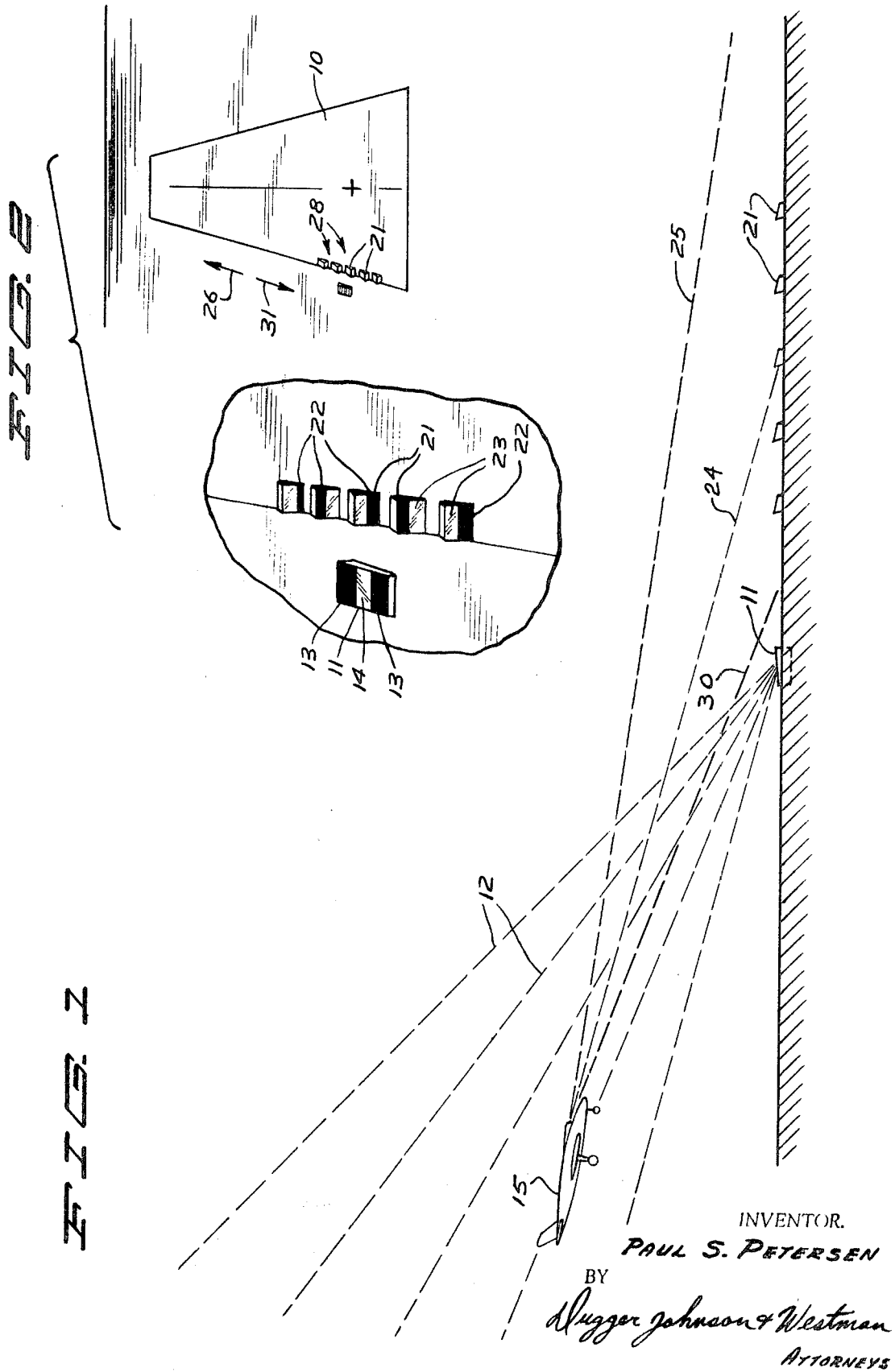
INVENTOR.
PAUL S. PETERSEN
BY
Dugger Johnson & Westman
ATTORNEYS PATENTED MAY 25 1971
3,581,275
SHEET 2 OF 3
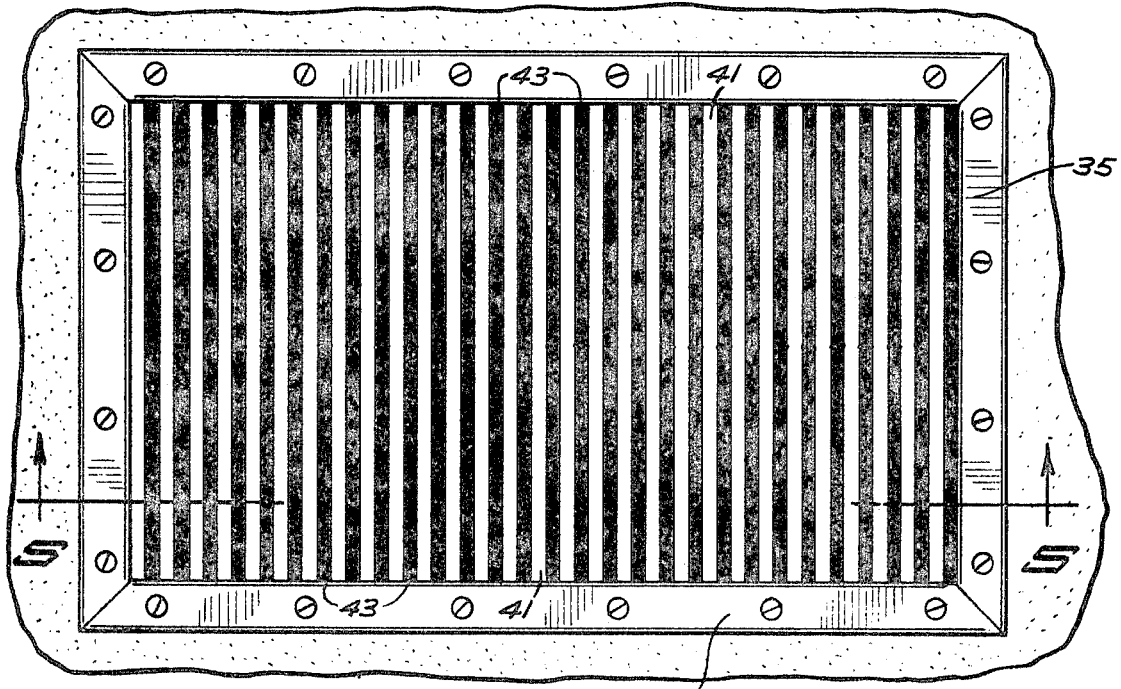
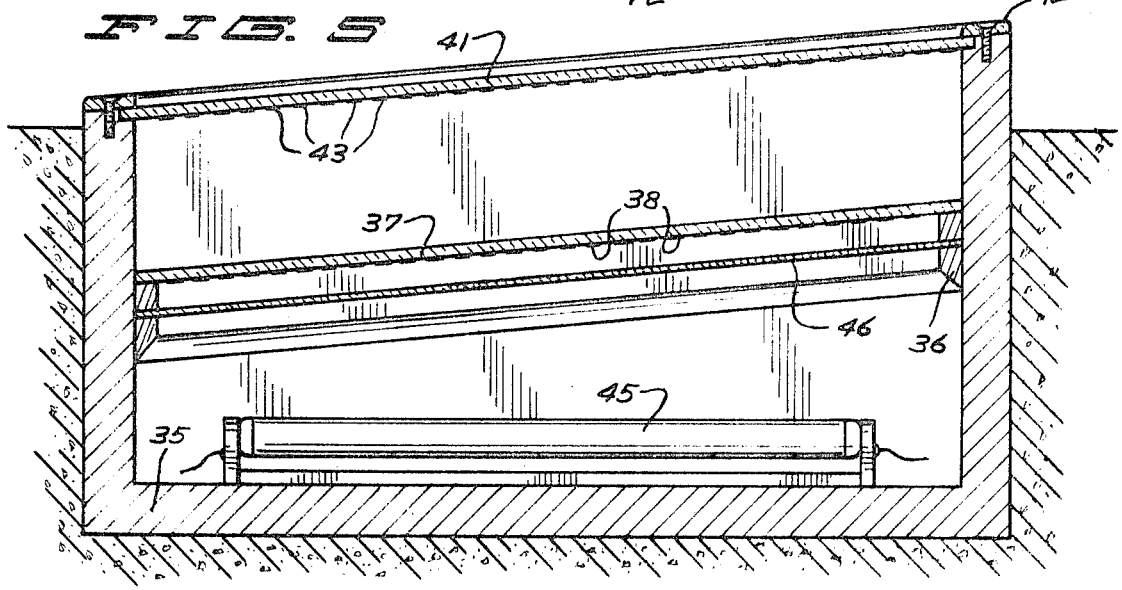
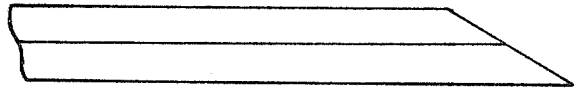
INVENTOR.
PAUL S. PETERSEN
BY
Dugger Johnson & Westman
ATTORNEYS

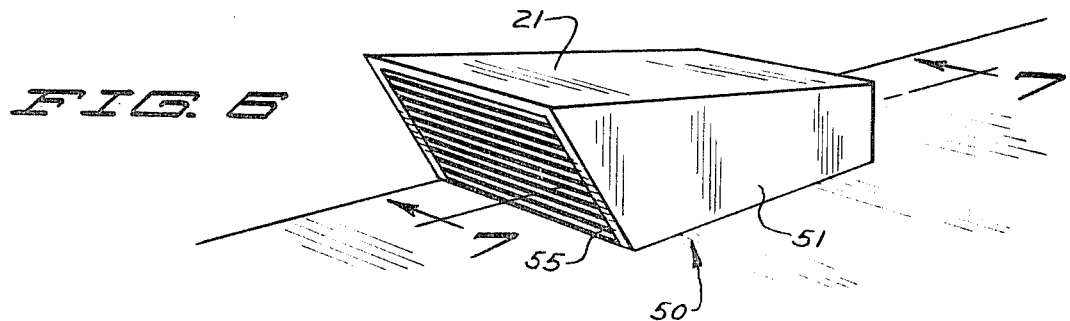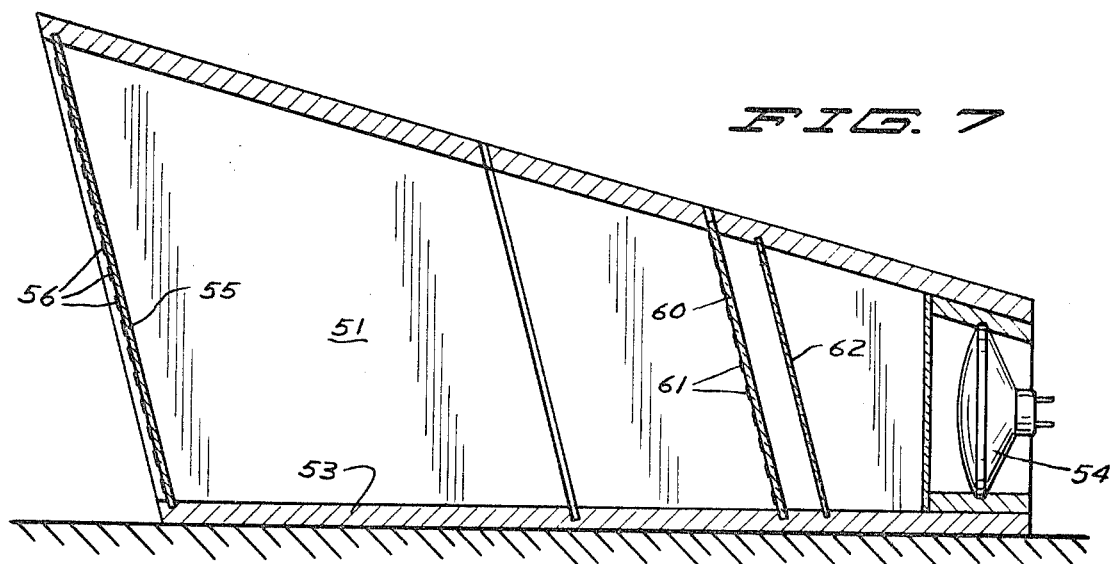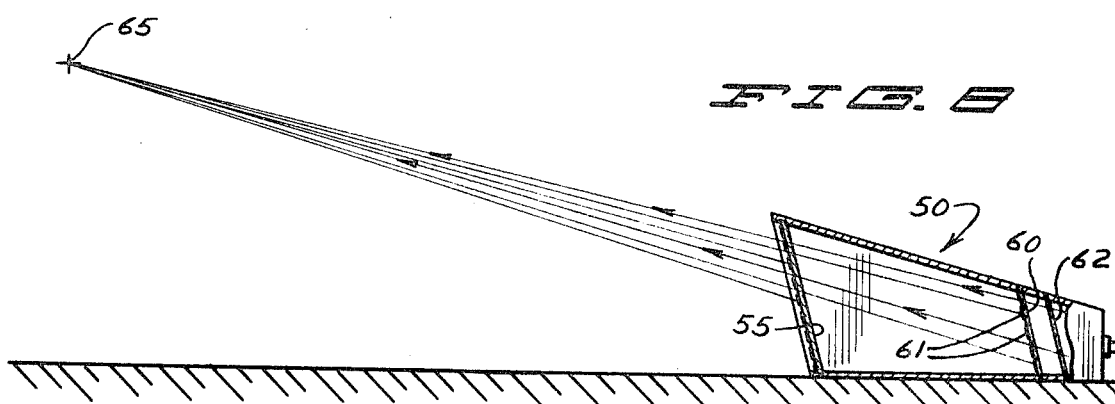

MOIRE FRINGE PRODUCING DEVICE USED FOR INTERCEPTION COURSE INDICATION

INTERCEPTION COURSE INDICATING MEANS

The present invention has relation to an indicating means or device which will indicate when an observer moving relative to another object is on a collision or interception course with the other object.

At the present time, there are several indicators utilized for indicating when an object is moving in a correct manner with respect to another object. This is most frequently used in connection with approach systems for landing aircraft at the proper position on a runway. At the present time, a device known as the V A S I System (visual approach slope indicator) is used. This system is described and claimed in U.S. Pat. No. 3,134,959.

The system utilizes a colored light system. The lights are placed alongside the runway and when a pilot is on the correct glide slope for a touchdown a certain light condition will exist. When the pilot is too low a still different light condition will exist.

This works well in commercial airline applications because the proper glide slope is predetermined for most commercial airliners and if they always approach on the same glide slope angle, they will always touchdown at the correct spot.

However, when you get into the situation where light planes and helicopters are being landed, the fixed glide slope indicator does not work satisfactorily because the pilot of a helicopter, for example, can execute a correct approach on any one of several different radials. In some instances, the approach angle or landing glide slope will be 45° or more for a helicopter.

Likewise, for light planes the glide slope angle at which a plane can be landed can be any preferred angle (within a reasonable range) and the angle is usually selected as a matter of personal preference of the pilot.

Nevertheless, some type of a landing aid which will indicate to a pilot of a light plane or helicopter when he is on the proper glide slope or radial for touchdown at a particular spot in the runway, is helpful. In helicopters, where landing is usually made within a 100 foot circle, it is important for the helicopter pilot to know when he is on a glide path which will result in touchdown at the desired point.

The device of the present invention operates on a principle which requires very little physical equipment and yet will indicate when the object approaching the indicating equipment is on a collision course or interception course with the equipment. If the observer is not going to intercept the equipment, the direction of necessary correction is indicated. The principle of operation makes the unit indicate the interception course at any radial line from the unit. While the most common adaptation, again, is envisioned as being in regard to landing aids for aircraft, the unit could also be adapted to indicate relative movement between ocean going vessels, satellites (for a space rendezvous) or other movable objects. In the case of landing an aircraft on a carrier deck, there would be movement of both the carrier and the plane with relation to the earth's surface and also relative movement between the plane and the carrier. The indicating device will indicate when the plane is on a correct interception course with the carrier even though the carrier is moving relative to the earth.

The device of the present invention involves the use of equipment which will display a fringe pattern commonly called the Moire fringe. The use of Moire fringes has been explored for various instruments, usually for indication of close tolerances of surfaces and similar applications. The Moire fringe pattern is normally produced by placing two grids or gratings comprising parallel spaced bars that won't transmit light so that the planes thereof are spaced a predetermined amount, and with a light source behind the gratings. When the front grating is looked at, the appearance to the eye will be a wide dark line where there is interference caused by the gratings and a wide lighter band where light will shine through the spaces between the bars of the gratings. The bars will still be visible in the light band, but the appearance to the eye is markedly different from the heavy black band where all light is shut off.

Depending upon the size and positioning of the gratings and the spacing between the bars on the gratings, one or more bands or fringes will appear. If the observer of the bands maintains an interception course toward some transverse line passing through the grating, the fringes or bands will not move along this line. As the observer gets close to the line, the outer bands move but the band aligned with remains stationary. If the observer moves toward the fringe but on a noncollision course with any portion of the device, all of the fringes will appear to move across the face of the indicator and in a direction which indicates the direction of error from an interception course.

The device of the present invention uses this phenomenon known as Moire fringing in connection with a landing aid or interception course indicator so that the pilot landing a plane at an airport wherein devices having Moire patterns are placed adjacent the end of the runway, can observe these patterns when on the final leg of his approach. When the Moire fringes he observes are not moving across the face of the grid, he will know that he is on a true radial with the grid and will touchdown aligned with the grid. If he is on a glide slope which will cause touchdown too far down the runway, (overshoot the landing) the Moire fringes will appear to move in the direction which he is traveling, and if he is too low (undershoot) the Moire fringes will appear to move toward the plane.

The device is easily installed and can be made within close enough tolerances to be practical. It will work for any glide slope and thus is adaptable to use as a landing aid for helicopters.

The device will be valuable as a training aid for student pilots because it indicates when the glide slope is correct for touchdown at a predetermined point. Thus the student will have a readily visible means to properly guide him on a proper course. Experienced pilots also have a reference and a valuable indicator for use at night and during inclement weather. The landing aid of the invention also is valuable in emergency situations. If the engine or engines of an aircraft fail in the vicinity of an airport, the pilot has only one try for a successful landing. The landing aid will indicate when the pilot is on a correct glide slope to touchdown properly. Without power, the glide slope may be different than a normal landing glide slope. As long as the fringes don't move, the pilot knows he will land at the proper location, and he can pick the angle of glide to make sure he maintains flying speed and doesn't stall.

It is therefore an object of the present invention to present a Moire fringe pattern device for indicating interception courses between two relatively moving objects.

It is another object of the present invention to use the Moire fringe pattern principle as a suitable aid to indicate a proper interception course between an observer moving relative to an object on which the Moire fringe pattern producing device is placed.

It is another object of the present invention to produce a landing aid utilizing Moire fringe pattern devices which will indicate the proper touchdown point to the pilot of an aircraft or helicopter.

It is still another object of the present invention to present a landing aid for aircraft which is easily produced and installed.

Other objects are those inherent in the specification and will be apparent as the description proceeds.

In the drawings,

FIG. 1 is a side elevational view of a runway and having landing aids made according to the present invention installed thereon and showing an aircraft approaching the runway;

FIG. 2 is a perspective view of a runway having landing aids made according to the present invention installed thereon and viewed as it would appear from an aircraft approaching the runway;

FIG. 3 is a schematic representation of an aircraft landing and using a landing aid of the present invention;

FIG. 4 is an enlarged top plan view of a landing aid using the principles of the present invention and devised primarily for use with helicopters;

FIG. 5 is a sectional view taken as on line 5-5 in FIG. 4;

FIG. 6 is a perspective view of a landing aid unit utilizing the principles of the present invention and used with fixed wing aircraft;

FIG. 7 is a sectional view taken as on line 7-7 in FIG. 6; and

FIG. 8 is a schematic representation of the normal lines of sight in connection with the device of FIG. 6.

Referring to the drawings and the numerals of reference thereon, the examples will deal with the use of a Moire fringe pattern producing device in connection with a landing aid. It can be seen that a runway 10 is illustrated in FIG. 2 as it would appear for an aircraft 15 approaching the runway for a landing.

Actually two forms of the invention are shown, one of which is adaptable for use of helicopters and the other of which is adaptable for use with small airplanes. A first Moire fringe pattern producing device 11 is mounted adjacent the runway and is usable for helicopters where the angles of approach will usually range between 8° and 45°. These radial lines are illustrated at 12 and are indicative of the free selection of approach angles that is possible for the helicopter pilots.

When viewed, the fringe producing device 11 will show alternate dark bands or fringes 13 and light bands or fringes 14. As long as the pilot approaches on one of the true radial lines extending from the device, these fringes will not move relative to the ground or to the device. If other than a collision or interception course is maintained, the bands or fringes will appear to move across the face of the device 11.

As can be seen, the device 11 has a top surface inclined upwardly from the horizontal. The fringe pattern or bands on this device would not be visible readily from the low angles of approach utilized with small aircraft.

For light fixed wing aircraft, an array 20 of Moire fringe pattern boxes 21 (five as shown) are mounted adjacent one side of the runway 10 and are constructed so that the faces thereof will be visible by pilots of light aircraft within the normal range of approach angles used with light aircraft. The construction of the boxes 21 will be more fully explained later. However, as is illustrated in FIG. 2, and schematically in FIG. 3, the Moire fringes produced in the boxes 21 will be visible by an observer in the approaching aircraft. In FIG. 2, the bands or fringes actually will appear to extend from one of the boxes 21 to the other. The black bands or fringes are illustrated at 22 and the light bands or fringes are indicated at 23.

When a plurality of the boxes 21 are arranged as shown, their faces will be viewed by a pilot as if they were on a single plane. The plane of each of the viewed faces of each of the boxes is parallel to the others and although they are spaced longitudinally along the axis of the runway, the visual effect is as if the viewed faces were on a single plane. This means that the fringe pattern produced will be more clearly visible because of the array 20 utilized, and in effect this gives a larger area to the fringe patterns.

The Moire fringes will appear to remain stationary on the faces of the boxes 21 from a distance as long as the glide path of the aircraft 15, illustrated for example by line 24 in FIG. 1, is on an interception course with the center of the pattern produced by the array. If the plane gets closer to the array, the outer fringes will move while the fringes on the true line of interception will remain stationary. If the true glide path of the aircraft is along the line 25, or in other words is such that the aircraft will overshoot its desired landing point, all of the fringes 22 will appear to move in direction as indicated by the arrow 26, or in other words down the runway. If the aircraft is on a true glide path as illustrated by the line 30, which would be undershooting the desired point of landing, all of the fringes will move as indicated by arrow 31, or back toward the aircraft. This is also shown in FIG. 3.

The movement of the fringes if a true interception course is not held gives a feeling of motion to the pilot which is easily discernable when compared to trying to see the changes in color of lights, as is present in the V A S I System. Also, the rate of movement of the fringes gives the pilot an indication of the amount of deviation from a true interception course.

Referring next to FIGS. 4 and 5, the device 11 for producing fringe patterns which are seen from a helicopter is shown. It comprises a housing 35 which is mounted into the ground 40 and extends above runway level (it can actually be mounted directly on top of the ground, if desired). The housing is rectangular in shape, as shown, and has a support 36 extending around the periphery thereof and part way up the sidewall. The support 36 supports a grating comprising a pane of glass 37 on which a number of spaced black parallel lines 38 are painted. The lines are very thin, and are evenly spaced along the surface of the glass. These lines are parallel. A top grating comprising a pane of glass 41 is mounted adjacent the upper portions of the housing 35 and is suitably supported in place, as for example with a molding 42. The pane 41 has spaced black lines 43 painted thereon. These lines are also parallel, and are evenly spaced along the surface of the glass. The planes of the glass must be parallel. The lines 38 and 43 are also parallel. The black lines can be spaced directly above one another or can be offset slightly. The black lines are about the same width as the spaces between the lines, or can be slightly wider than the spaces.

In place of small lines painted on glass, gratings can be formed from individual thin strips of material mounted in the box, if desired. The distance between the planes of the gratings enters into the size of the fringes or bands observed by the pilot. A suitable light source 45 is mounted in the bottom of the housing 35 and the bottom of the box is light reflecting. A light diffuser 46 can also be used for evenly distributing the light transmitted through the two panes of glass. Several light bulbs can be used if desired.

When the box is looked at, the light shining through the gratings will produce what is known as a fringe pattern. This will mean alternating dark black and light bands or fringes will be observed even though a plurality of small individual black bars are present in each of the panes. This is due to the interference of the black bands preventing light transfer in certain areas and light coming through the spaces between the bars in other areas. The fringe pattern will be alternating black and light along the face of the unit. If the aircraft continues on an interception course with the device producing the Moire or interference fringe patterns, the fringes or bands will appear to remain stationary. If the aircraft is either overshooting or undershooting, the fringes will appear to move. This will give a sense of motion to the observer and by proper correction of the glide until the patterns become stationary, touchdown can be effected at the desired point. The bands or fringes produced are shown in FIGS. 2 and 3.

Use of glass for the gratings makes the positioning of the black bars relatively simple. Care in selection of the glass should be exercised to insure nondistortion. Open gratings can be used, but should be shielded to prevent excessive dirt and snow from getting into the device.

The devices as shown in FIGS. 3 and 4 are suitable for use with helicopters mainly and other objects where the interception courses are at a relatively high angle with respect to the plane of the grids.

Where the interception course or glide path is at a relatively low angle with respect to the horizontal, it is desirable to use a grid which has an upright plane, rather than horizontal. Such a device is shown in FIG. 6, 7 and 8. In the device of FIGS. 6, 7 and 8, one of the boxes 21 is shown in detail. The box comprises an outer housing 50 which has a pair of sidewalls 51,51, a top 52, and a bottom 53. At the rear portion of the housing a suitable illumination source 54 is mounted. As shown, an ordinary automobile headlight is utilized. This provides relatively intense light and sufficient illumination so that the device can be seen from the air at night. Two or more of the headlights

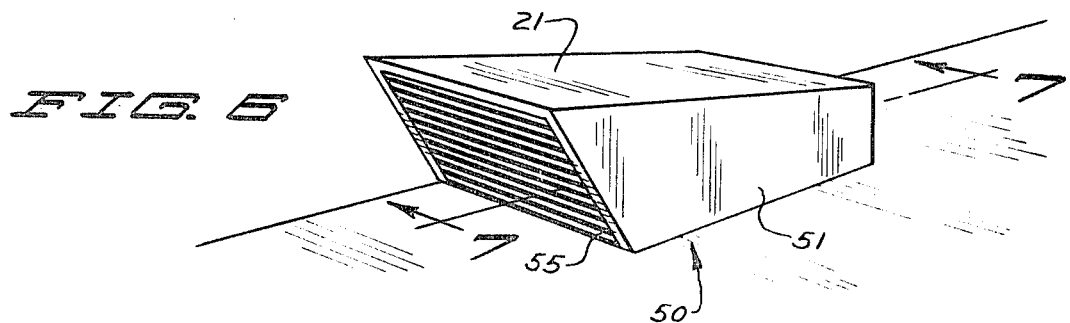
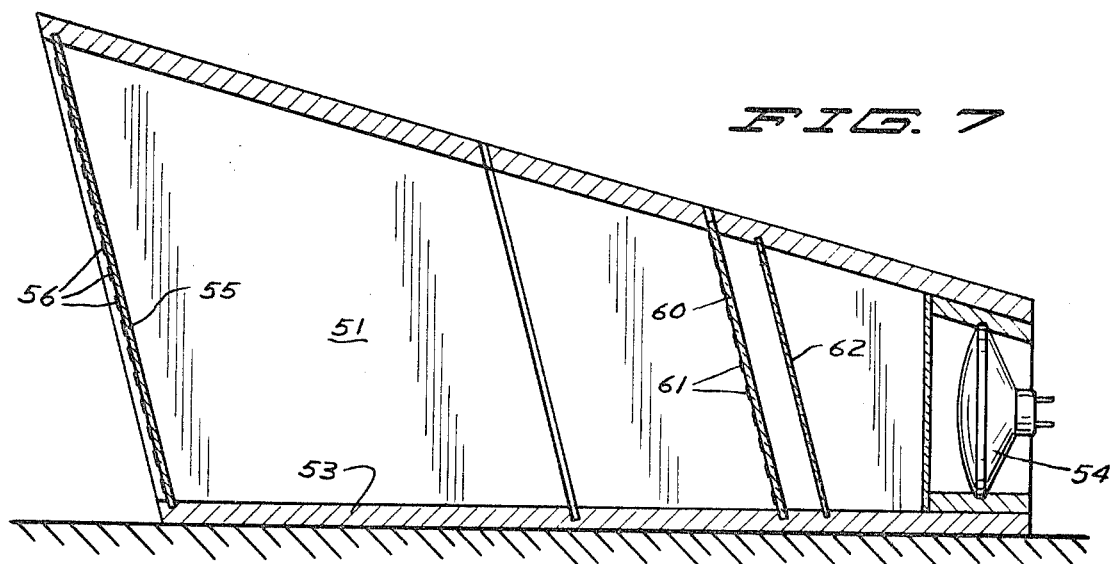
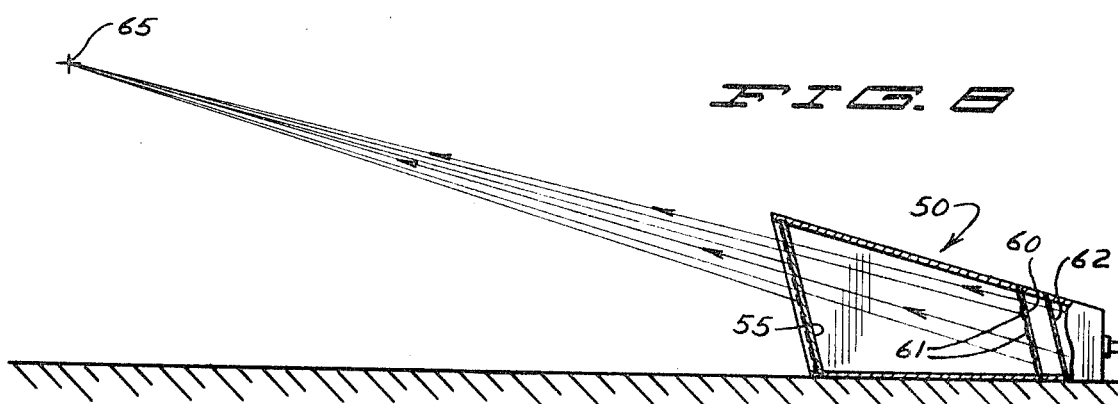
INVENTOR.
PAUL S. PETERSEN
BY
Dugger Johnson & Westman
ATTORNEYS parallel and substantially the same width, and the strip on each of said members being substantially parallel to the strips on the other of said members, said planar members being spaced apart and the strips being of size to form a Moire fringe pattern comprising visible alternating light and dark bands substantially wider than the individual strips when the closest planar member is in view at an acute angle, a light source positioned on a side of said planar members opposite from the second object, said Moire fringe pattern formed by the narrow strips on said planar members and said light source being of size to be visible to an observer on the second object.

6. A landing aid for aircraft comprising a plurality of housings spaced apart from each other and each positioned adjacent the desired area of touchdown of an aircraft, and extending generally in direction of the ground component of aircraft movement, each housing including a first planar member in an opening defined in said housing, said first planar member of each housing being visible from an aircraft using said aid and being parallel to the first planar member of the other housings, a separate second planar member parallel to said first planar member in each housing and being spaced further from the aircraft using said aids than said first planar members, said planar members each comprising a plurality of substantially parallel narrow light transmitting and nonlight transmitting bars, the longitudinal axes of which are perpendicular to normal direction of aircraft approach, and a separate light source in each housing on the opposite side of the second planar members from the aircraft using said aid to form usable Moire fringes substantially wider than the individual bars.

UNITED STATES PATENT OFFICE
CERTIFICATE OF CORRECTION

Patent No. 3,581,275      Dated May 25, 1971

Inventor(s) Paul S. Petersen

It is certified that error appears in the above-identified patent and that said Letters Patent are hereby corrected as shown below:

Column 1, line 20, after "exist" insert --When the pilot is too high a different light condition will exist, and--.

Signed and sealed this 12th day of October 1971.

(SEAL)
Attest:

EDWARD M. FLETCHER, JR.      ROBERT GOTTSCHALK
Attesting Officer      Acting Commissioner of Patents